(12) United States Patent
Montgomery et al.

(10) Patent No.: US 6,801,701 B1
(45) Date of Patent: Oct. 5, 2004

(54) SYSTEM FOR BENDING POLYMER OR GLASS OPTICAL WAVE GUIDES

(75) Inventors: Eric W. Montgomery, Springfield, MO (US); Robert W. Speer, Springfield, MO (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/604,564

(22) Filed: Jul. 30, 2003

Related U.S. Application Data
(60) Provisional application No. 60/319,667, filed on Nov. 4, 2002.

(51) Int. Cl.[7] .................................................. G02B 6/10
(52) U.S. Cl. ........................... 385/129; 385/27; 385/31; 385/32; 385/130; 385/131; 65/385; 65/386
(58) Field of Search ............................. 385/27, 31, 32, 385/129–131; 65/385, 386

(56) References Cited

U.S. PATENT DOCUMENTS

| | | | |
|---|---|---|---|
| 4,937,029 A | | 6/1990 | Ishiharada et al. ............ 264/1.4 |
| 5,581,649 A | * | 12/1996 | Paquette et al. ............. 385/140 |
| 5,633,494 A | | 5/1997 | Danisch .................. 250/227.16 |
| 6,314,219 B1 | * | 11/2001 | Zhang et al. .................. 385/32 |
| 6,381,386 B1 | * | 4/2002 | Nishikawa .................... 385/32 |

* cited by examiner

*Primary Examiner*—Akm Enayet Ullah
*Assistant Examiner*—Daniel Petkovsek
(74) *Attorney, Agent, or Firm*—Marsteller & Associates, P.C.

(57) ABSTRACT

A bend (B) in a wave guide (G) is formed having two angled cuts (201, 202) on either side of a middle pivot point (207). The angled cuts (201, 202) extend through a first side of a cladding layer (101) of the wave guide formed with at least one inner layer (102) and one outer layer (101). The wave guide (G) is then bent at the angled cuts about the middle pivot point (207) to make a desired angle bend. The middle pivot point (207) has a reflective angled surface (401) such that light (404) propagating through the wave guide (G) will be reflected and turned at the desired angle.

8 Claims, 2 Drawing Sheets

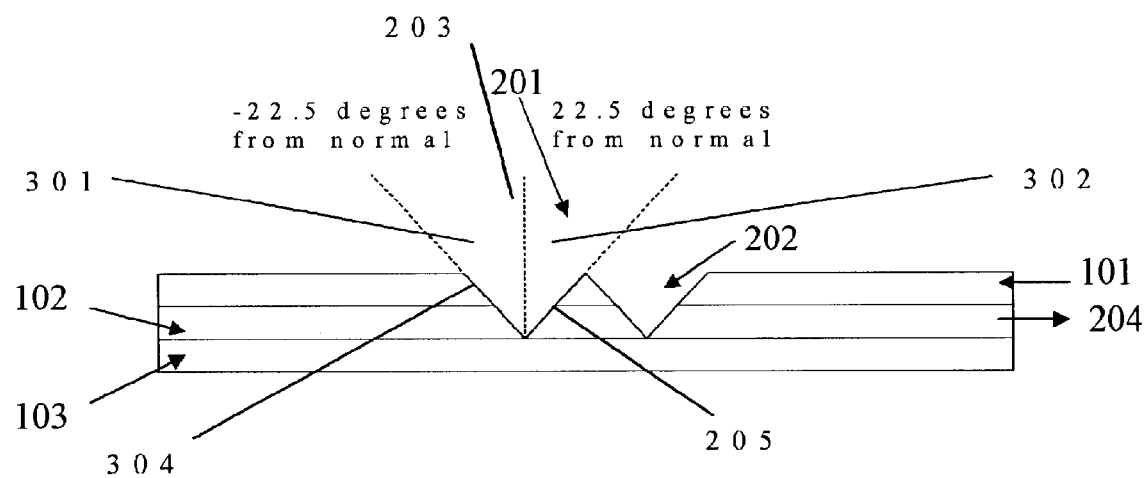
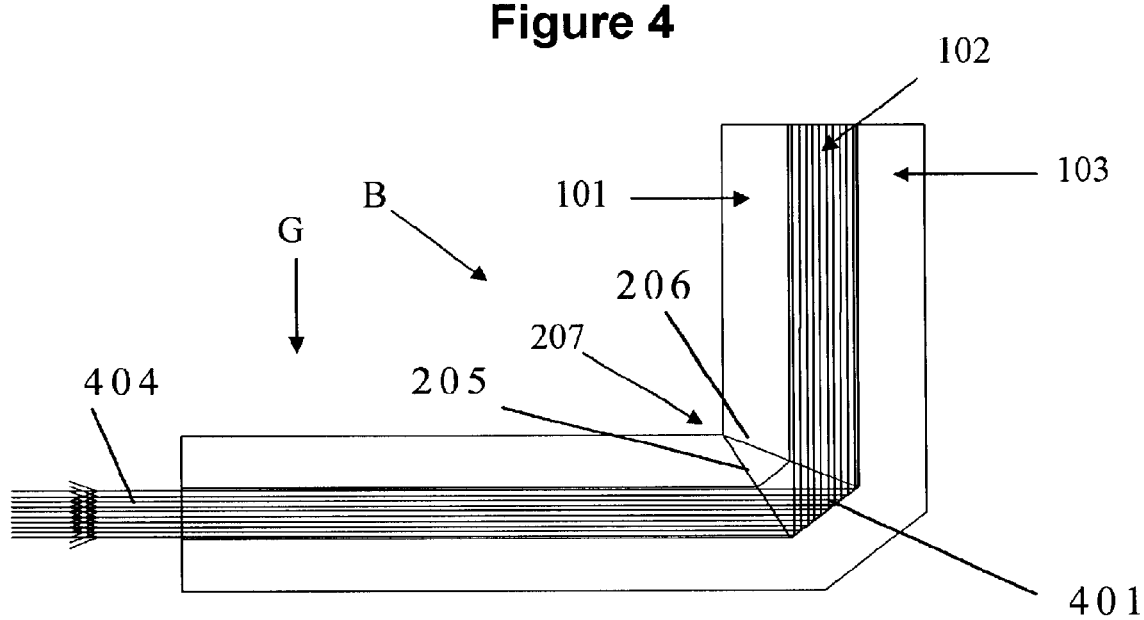

SYSTEM FOR BENDING POLYMER OR GLASS OPTICAL WAVE GUIDES

CROSS REFERENCE TO RELATED APPLICATIONS

This application claims the benefit of U.S. Provisional Application Ser. No. 60/319,667, filed Nov. 4, 2002, entitled SYSTEM FOR BENDING POLYMER OR GLASS OPTICAL WAVE GUIDES.

BACKGROUND OF INVENTION

1. Technical Field

The present invention relates to a method of optical interconnection for optical transmission between a printed circuit board ("PCB") daughter card and PCB backplane or midplane. More particularly, the present invention describes a method of turning a polymer wave-guide at a right angle at the PCB daughter card-PCB backplane/midplane interface using a technique that maintains wave-guide alignment.

2. Background Art

Optical wave-guides are generally constructed with a core of a light transmissible material and one or more cladding layers. The core may be made of synthetic plastic or polymer or a glass material. Additionally, the choice of core and cladding materials determine whether the wave-guide member is flexible or rigid.

Optical interconnect technology lacks reliable and cost effective method for turning a known wave-guide member at a right angle for the purpose of optical interconnection between a PCB daughter card and PCB backplane. The present invention offers an efficient solution for ninety degree bending and re-alignment of a flexible polymer wave-guide.

While the above cited references introduce and disclose a number of noteworthy advances and technological improvements within the art, none completely fulfills the specific objectives achieved by this invention.

SUMMARY OF INVENTION

The present invention consists of a right-angle turn in a polymer optical wave-guide layer that has at least one cladding layer of a lower index of refraction material on both sides (above and below) or surrounding the core element.

Two angled cuts are machined, using micro-machining techniques such as etching or laser ablation, through the top cladding layer and the wave-guide located in the middle or center layer. The angles are of a magnitude that will sum to ninety degrees total at the two joints when the top three layers are bent so that the angled faces are joined.

The angle of the cuts will be such that two joints of forty-five degrees each will be created on either side of a middle pivot piece. Thus a reflective angled surface is created such that the light propagating through the wave-guide is reflected and turned at a right angle.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIG. 3 shows the angle from normal of the edges of both cuts.

FIG. 4 shows the wave-guide bent at a right angle.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

The present interconnect scheme provides a unique method of turning a wave-guide at a right angle that is both cost effective and simple in nature.

Figure 1:
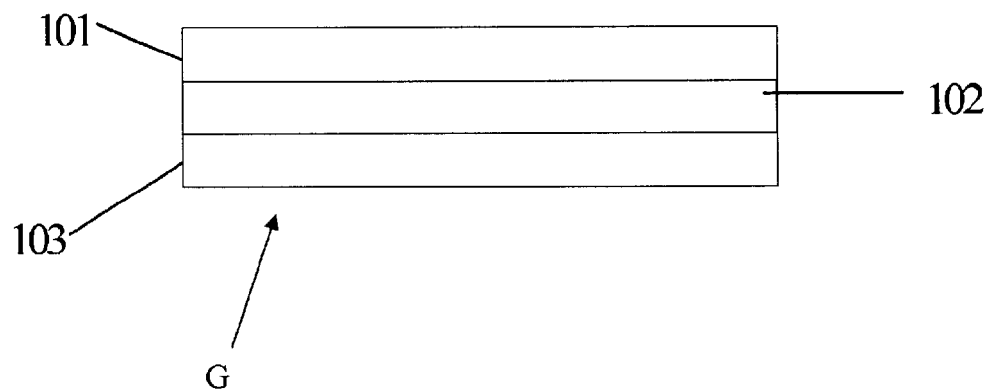
FIG. 1 is a side view of a known wave-guide and cladding layers before modification.

FIG. 1 shows the side view of a known wave-guide G having an inner element 102 sandwiched between two cladding layers 101, 103. The layers 101, 103 are of a lower index of refraction to promote internal reflection of the signal 404. Layer 101 is the top cladding layer, which will be cut or etched, and core element 102 is the wave-guide layer, which will also be cut or etched.

Core element 102 can consist of a plastic, polymer or glass material that has a characteristic ability to transmit a selected signal such as a beam or ray of light 404.

Cladding layer 103 is the bottom cladding layer that will remain intact, but is to be bent. This arrangement will add rigidity and a natural alignment to the structure.

Figure 2:
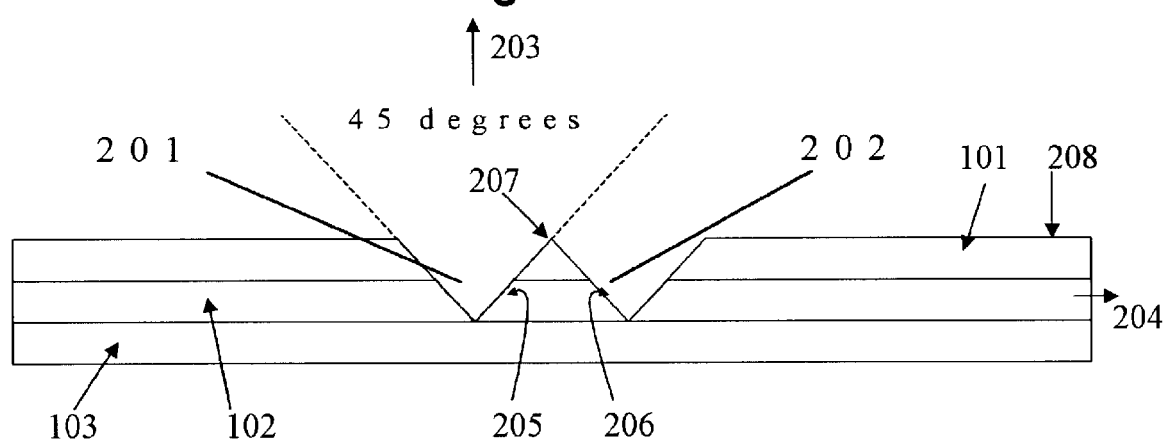
FIG. 2 shows the two forty-five degree notches cut into the top cladding layer of the wave-guide.

FIG. 2 shows the total angle of the cut in the top two layers 101, 102 of the arrangement. Groove 201 is a cut or etched area. Groove 201 spans forty-five degrees from one side to the other, and should be symmetrical about an axis 203 perpendicular to a longitudinal axis 204 through the wave-guide.

FIG. 3 shows the angle of the cut or etched area 201 from the normal line 203 extending out of the vertex. The total forty-five degrees is broken down into two symmetrical angles 301 and 302 twenty-two and a half degrees to either side of the normal 203. The two surfaces 304, 205 on either side of the cut or etched area 201 will join or tightly abut next to each other, allowing the wave guide G to be bent forty-five degrees.

Similarly, the wave guide G can be bent along a normal axis extending from the vertex of the angle cut 202 bringing together the opposing surfaces forming the angle cut 202.

The presence of two overlapping or adjacent cut or etched areas 201 and 202 will allow for a total bend of ninety degrees. As is shown in FIG. 2, angle cuts 201 and 202 are formed having adjacent sides 205 of angle cut 201 and side 206 of angle cut 202 intersect at an apex or pivot point 207. Pivot point 207 is preferably positioned aligned between or with the outer or exterior surface 208 of cladding layer 101.

FIG. 4 shows the final bent structure with a light signal 404 passing through the wave-guide portion 102. The back surface 401 of the bend B in the wave-guide layer 102 helps turn the signal 404 through reflection.

The wave guide G is illustrated having two cladding layers. It should be understood that a core element 102 surrounded by one or more cladding layers may also be used by taking the measurements and cuts along a central longitudinal axis of the wave guide G. Additionally, a right angle bend in shown in the wave guide, but other angles greater or less than ninety degrees may be similarly formed adjusting the angles of cuts 201 and 202.

It is anticipated that the optical interconnect system described by the present invention can provide a method of constructing a right angle bend in a wave-guide in a more cost efficient and simpler process than previous methods.

It is readily apparent that the present invention will be a great improvement over existing technology. The present invention will be easily compatible with current PCB manufacturing processes, thus allowing for ease of manufacture in a typical factory tooled for the production of printed circuit boards.

The foregoing disclosure and description of the invention are illustrative and explanatory thereof, and various changes in the size, shape and materials, as well as in the details of the illustrated construction may be made without departing from the spirit of the invention.

What is claimed is:

1. A method for bending a wave guide comprising the steps of:
    forming two angled cuts on either side of a middle pivot point having a first and second sides, said angled cuts extending through a first side of a cladding layer of the wave guide formed with at least one inner core layer and one outer cladding layer; and
    pivoting the wave guide at the angled cuts about the middle pivot point to make a desired angle bend in the wave guide,
    whereby the middle pivot point has a reflective angled surface such that light propagating through the wave guide will be reflected and turned at the desired angle.

2. The method of claim 1 wherein the wave guide is a polymer optical wave guide.

3. The method of claim 1 wherein the wave guide is a glass optical wave guide.

4. The method of claim 1 wherein each of the angle cut creates an angle approximately forty five degrees symmetrically formed about an axis normal to a longitudinal axis of the wave guide extending through a vertex of each respective angle cut.

5. A wave guide of the type having a signal transmissive core element and at least one cladding layer, the wave guide having a bend comprising:
    two angled cuts formed on either side of a middle pivot point having a first and second sides, said angled cuts extending through a first side of a cladding layer of the wave guide; and
    the wave guide having been pivoted at the angled cuts about the middle pivot point to make a desired angle bend in the wave guide,
    whereby the middle pivot point has a reflective angled surface such that light propagating through the wave guide will be reflected and turned at the desired angle.

6. The invention of claim 5 wherein the wave guide is a polymer optical wave guide.

7. The invention of claim 5 wherein the wave guide is a glass optical wave guide.

8. The invention of claim 5 wherein each of the angle cut creates an angle approximately forty five degrees symmetrically formed about an axis normal to a longitudinal axis of the wave guide extending through a vertex of each respective angle cut.

* * * * *